Nov. 20, 1934.  L. D. SOUBIER  1,981,636
APPARATUS FOR FORMING HOLLOW GLASS ARTICLES
Filed April 21, 1930  3 Sheets-Sheet 1
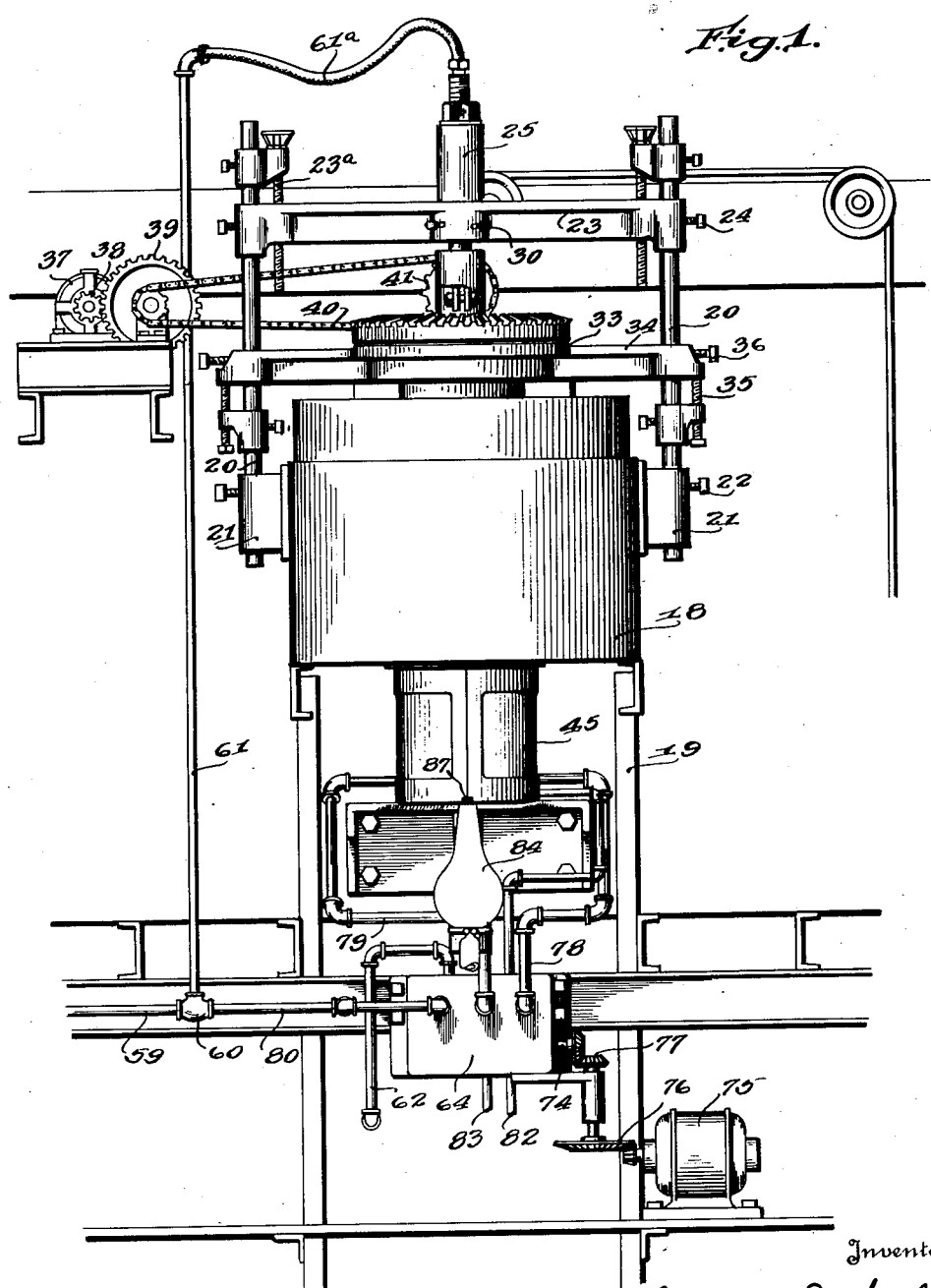
Inventor
Leonard D. Soubier
By
J. F. Rule,
Attorney

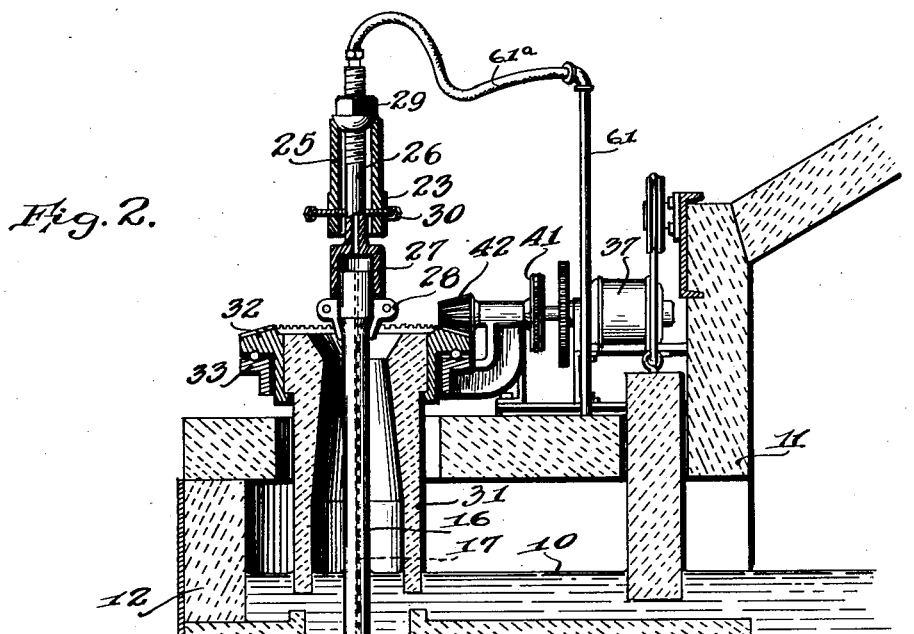

Nov. 20, 1934.  L. D. SOUBIER  1,981,636
APPARATUS FOR FORMING HOLLOW GLASS ARTICLES
Filed April 21, 1930   3 Sheets-Sheet 3
Fig. 5.
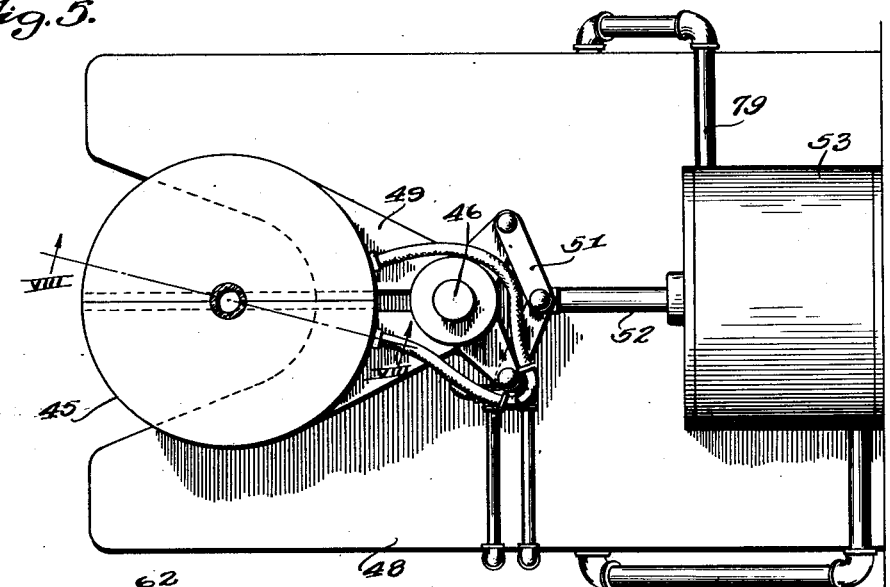
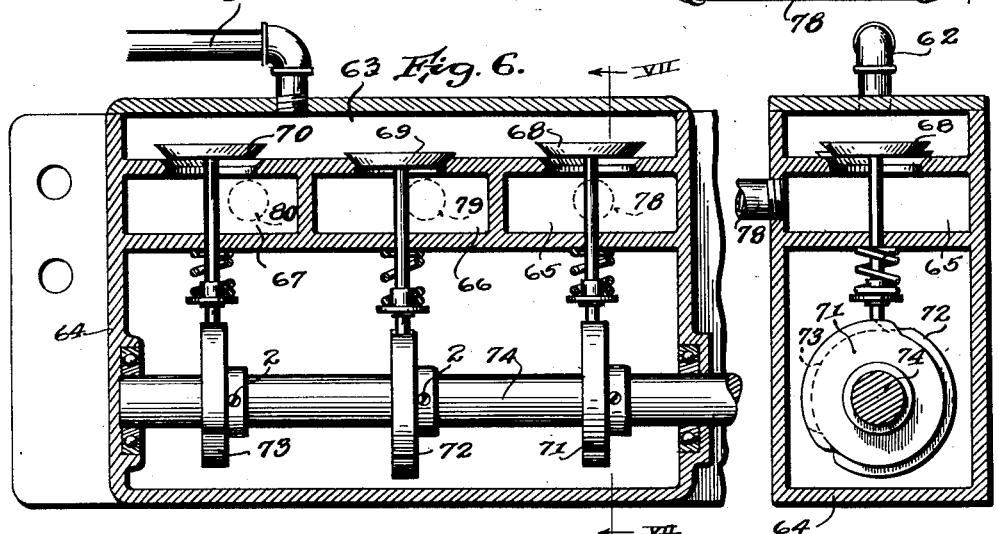
Fig. 6.
Fig. 7.
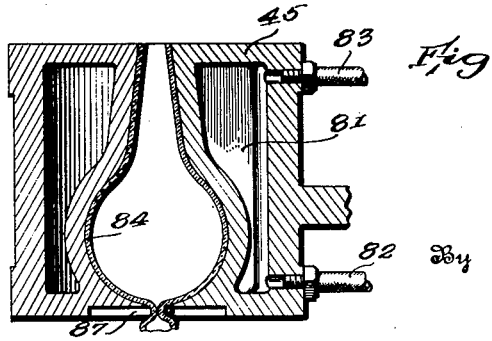
Fig. 8.
Inventor
Leonard D. Soubier
By J. F. Rule,
Attorney Patented Nov. 20, 1934

1,981,636

UNITED STATES PATENT OFFICE 1,981,636

APPARATUS FOR FORMING HOLLOW GLASS ARTICLES

Leonard D. Soubier, Toledo, Ohio, assignor to Owens-Illinois Glass Company, a corporation of Ohio Application April 21, 1930, Serial No. 445,894

2 Claims. (Cl. 49—5)

My invention relates to an apparatus for manipulating molten or plastic glass in the formation of electric light bulbs or other glass articles, and an object of the invention is to provide an improved apparatus for forming such articles by a continuous process. The invention provides means by which molten glass is caused to issue continuously in tubular formation from a bottom outlet of a container, and means for blowing successive lengths or sections of the tubular glass to the form or approximate form of a bulb or other desired article, while the glass is still connected with the supply body.

Other objects of the invention and the exact nature thereof will appear more fully hereinafter.

In the accompanying drawings:

Fig. 1 is a front elevation of an apparatus constructed in accordance with my invention.

Fig. 2 is a sectional side elevation of the same.

Fig. 3 is a detail view of a three-way valve.

Fig. 4 is a detail view of a pair of supporting arms.

Fig. 5 is a plan view showing the mold and its operating mechanism.

Fig. 6 is a sectional elevation view of a valve box and valves controlling the air supply for blowing the glass and for operating the air motor.

Fig. 7 is a section at the line VII—VII on Fig. 6.

Fig. 8 is a sectional view of the mold, the section being taken at the plane of the line VIII—VIII on Fig. 5.

Molten glass 10 is continuously supplied from a main furnace 11 to a forehearth extension or boot 12 formed with a well 13 in the floor thereof, terminating in an outlet orifice 14 through which the glass issues. The issuing glass is given a tubular formation by means of a shaping implement comprising a conical head or mandrel 15 having a stem 16. The tapered head 15 and tapered walls of the well 13 provide an annular passageway for the issuing glass. An opening 17 extending lengthwise through the stem 16 and head 15 provides a passageway through which air under pressure is supplied for giving hollow formation to the issuing glass and for expanding it as hereinafter fully set forth.

The forehearth 12 is surrounded by a metal casing or frame 18 and supported by the angle iron structure 19. A pair of supporting rods 20 are located on opposite sides of the forehearth and are mounted for vertical adjustment in bearings 21 fixed to the frame 18, said rods being secured in adjusted position by clamping screws 22. A yoke 23 is adjustable vertically on the rods 20 by means of adjusting screws 23ª and held in adjusted position by clamping screws 24. The yoke is formed with a cylindrical post 25 projecting upwardly therefrom. A rod 26 extends through the member 25 and is provided at its lower end with a cylindrical head 27 which fits over the enlarged upper end of the stem 16 and is secured thereto by a clamp 28. The rod 26 is screw threaded and carries a bearing nut 29 which seats on the upper end of the post 25. It will be seen that with the construction just described, the mandrel 15 is supported from the yoke 23. Adjusting screws 30 threaded in the yoke 23 and engaging the rod 26, provide a means for adjusting the mandrel to a position centrally of the outlet orifice and hold it in adjusted position.

A stirring implement 31 consisting of a tube or sleeve of refractory material surrounds the stem 16 and projects downward into the glass. Said implement is mounted in a bevel gear 32 supported on an annular bearing plate 33 formed on a yoke 34 (Fig. 1) mounted on the rods 20. The stirring implement 31 is adjustable vertically. For this purpose the yoke 34 is adjustable up and down by means of adjusting screws 35 and held in adjusted position by set screws 36. The stirring implement may be rotated continuously by means of an electric motor 37 operating through gears 38 and 39 to drive a sprocket chain 40 which in turn drives a sprocket wheel 41 on a shaft carrying a pinion 42 running in mesh with the gear 32.

The apparatus above described by means of reference numerals, is in the main substantially similar to apparatus disclosed in U. S. Patent 1,750,971 granted to me March 18, 1930, and forms no part of the present invention, except in combination with other parts hereinafter set forth.

Beneath and in register with the outlet 14 is a mold 45 comprising separable sections mounted to swing about the axis of a vestical pivot shaft 46. The mold 45 and an air motor 53 for opening and closing the mold are mounted on a platform or bracket 48. The mold sections are carried by arms 49, one of which is fixed to the shaft 46 and the other to a tubular shaft or sleeve 50 mounted on the shaft 46. A pair of links 51 connect the mold arms with a piston rod 52 connected to the piston 54 of the air motor 53. The piston 54 is periodically reciprocated as hereinafter set forth and operates through the mechanism just described to open and close the mold.

The concentric shafts 46 and 50 are extended downward below the bracket 48 and at their lower ends carry a pair of arms 55. These arms at their outer ends are shaped to form a supporting ring 56, the purpose of which will be described later. It will be seen that these arms open and close with the mold sections.

In order to give the desired hollow formation to the issuing glass, air under pressure is supplied thereto through the mandrel 15. The air pressure is continuous, but is alternately increased and decreased at predetermined time intervals in synchronism with the opening and closing movements of the mold. While the mold is open, a low air pressure is maintained sufficient to give a straight tubular formation to a section 57 of the issuing glass. The mold then closes and a comparatively high air pressure is supplied to expand the glass in the mold to the shape of the mold cavity 58. The low air presure is continuously supplied from any suitable source (not shown) to a pipe 59 (Fig. 1) connected to a three-way valve 60. The air line extends from the valve 60 through pipes 61 and 61ª to the upper end of the rod 26 and thence through said rod and the passageway 17 to the outlet 14.

Air under high pressure is supplied through a pipe 62 to an air pressure chamber 63 formed in a valve box 64. Air is distributed from the chamber 63 to pressure chambers 65, 66 and 67 under the control of valves 68, 69 and 70 individual to said chambers respectively. These valves are actuated by cams 71, 72 and 73 mounted on a cam shaft 74 which is rotated continuously by a motor 75 (Fig. 1), operating through intermediate gears 76 and 77. The cams are individually adjustable rotatively on the shaft 74 to adjust the timing of the valves and are held in adjusted position by set screws 2. The valve chamber 65 is connected through a pipe 78 to the inner end of the air motor 53. A pipe 79 extends from the forward end of the motor cylinder to the valve chamber 66. A pipe 80 extends from the valve chamber 67 to the three-way valve 60.

Each half of the mold 45 is made hollow or formed with a chamber 81 through which water, air or other cooling fluid may be circulated. The cooling fluid is conducted to and from the mold sections through pipes 82 and 83.

The operation may be described as follows:

The glass as it issues and moves downward from the outlet orifice 14 first assumes the form of a tubular section 57. Each section 57 when it attains the length of the mold 45 is enclosed in the mold and expanded to form a bulb or bulbular section 84. The mold then opens and the bulb 84 moves downward below the mold while the next succeeding tubular section 57 is being formed. In this manner a continuous series of connected bulbs 84 is formed.

During the formation of a tubular section 57, low pressure air is supplied through the pipe 59, valve 60, pipes 61, 61ª, and through the passageway 17 in the mandrel. When a tubular section 57 has been formed as shown in Fig. 2, the cam 71 (Figs. 6 and 7) opens the valve 68, thereby supplying air from the pressure chamber 63 to the valve chamber 65 and thence through pipe 78 to the air motor 53 so that the piston 54 is moved forward and closes the mold. As soon as the mold is closed, the cam 73 lifts the valve 70, thereby supplying high pressure air to the valve chamber 67 and through the pipe 80 to the three-way valve 60 (see Fig. 3). This high pressure immediately swings the valve member 86 over to close the low pressure pipe 59 and admit the high pressure air to the pipe 61. This pressure is sufficient to expand the tubular section 57 in the mold cavity, thus forming a bulb 84 or other hollow article, depending on the shape of the mold.

The mold is of such form that when the mold sections come together around the parison 57 the lower end thereof is pinched or squeezed sufficiently to close or seal the tube at this point and prevent the air pressure from extending beyond the mold. The mold sections may be provided with recesses 87 in their lower faces to accommodate the excess glass where the tube 57 is squeezed by the mold.

When the glass is blown in the mold it quickly sets or hardens sufficiently to retain its shape. The valve 70 now closes to cut off the high pressure air supply and the mold is then opened. Opening of the mold is effected by first closing the valve 68 and then opening the valve 69 by means of its cam 72 so that air pressure is transmitted from the valve chamber 66 through pipe 79 to the forward end of the motor 53. When the mold opens, the flow of glass from the orifice 14 is resumed and thereby forms a succeeding tube or parison 57. It will be noted that as soon as the high pressure is cut off, the valve member 36 (Fig. 3) is thrown over by the low pressure air from the pipe 59, thus shutting off the pipe 80 and reestablishing the low pressure air line.

The formation of the tubular sections 57 while the mold is in open position is assisted by the weight of the bulbs 84 which are still integrally connected therewith. In addition to this weight, any suitable means (not shown) may be provided to increase or regulate the downward tension applied to the issuing glass and control the rate at which the tubular parison or the formed portion thereof moves downward during the formation of such parison. The formed bulbs 84 are cracked off and further processed to form finished articles. As the mold 45 closes around a tube section 57, the arms 55 close beneath the bulb 84 which is immediately below said tube section so that the bulb rests on and is supported by the ring 56. Said arms also support the weight of the glass beneath the arms. The glass at the lower end of the mold is thus relieved of any strain and prevented from being stretched downward out of shape.

Modifications my be resorted to within the spirit and scope of my invention.

What I claim is:

1. The combination of a mold comprising horizontally separable sections, means for periodically opening and closing the mold, means for blowing a parison of glass in the closed mold, a support below the mold, and means for swinging said support to an operative position beneath the mold when the latter closes for supporting a preceding formed article connected to the parison in the mold.

2. In a machine for forming glass articles, the combination of a mold comprising horizontally separable sections, mold arms carrying said sections and mounted to swing about a vertical axis for opening and closing the mold, and a pair of supporting arms spaced below the mold and connected to swing with the mold sections to and from an operative position.

LEONARD D. SOUBIER.